(12) United States Patent
Dill

(10) Patent No.: US 10,914,335 B2
(45) Date of Patent: Feb. 9, 2021

(54) ANCHOR ASSEMBLY

(71) Applicant: Illinois Tool Works Inc., Glenview, IL (US)

(72) Inventor: Michael Dill, Elk Grove Village, IL (US)

(73) Assignee: Illinois Tool Works Inc., Glenview, IL (US)

( * ) Notice: Subject to any disclaimer, the term of this patent is extended or adjusted under 35 U.S.C. 154(b) by 79 days.

(21) Appl. No.: 16/177,759

(22) Filed: Nov. 1, 2018

(65) Prior Publication Data

US 2019/0154069 A1   May 23, 2019

Related U.S. Application Data

(60) Provisional application No. 62/589,241, filed on Nov. 21, 2017.

(51) Int. Cl.
*F16B 13/12* (2006.01)

(52) U.S. Cl.
CPC ................... *F16B 13/124* (2013.01)

(58) Field of Classification Search
CPC .................................................... F16B 13/124
See application file for complete search history.

(56) References Cited

U.S. PATENT DOCUMENTS

| 2,871,749 | A | * | 2/1959 | Kalb | F16B 39/023 |
| | | | | | 411/80.1 |
| 3,143,915 | A | * | 8/1964 | Tendler | F16B 13/061 |
| | | | | | 411/29 |
| 5,067,864 | A | | 11/1991 | Dewey et al. | |
| 7,934,895 | B2 | * | 5/2011 | Ernst | F16B 37/127 |
| | | | | | 411/44 |
| 8,449,236 | B2 | | 5/2013 | McDuff et al. | |
| 2005/0079027 | A1 | * | 4/2005 | Ernst | F16B 37/127 |
| | | | | | 411/44 |

FOREIGN PATENT DOCUMENTS

| EP | 3243971 A1 | * 11/2017 | ......... B23B 51/0045 |
| GB | 2 276 689 | 10/1994 | |
| GB | 2276689 A | * 10/1994 | ............ F16B 13/124 |

OTHER PUBLICATIONS

International Search Report and Written Opinion from International Application No. PCT/US2018/058862, dated Feb. 15, 2019 (18 pages).
CONFAST® Nylon Nail-It Anchor, retrieved from the Internet at https://www.confast.com/products-nylon-nail-it, on Apr. 3, 2019 (available prior to Nov. 1, 2018) (6 pages).

(Continued)

*Primary Examiner* — Bayan Salone
(74) *Attorney, Agent, or Firm* — Neal, Gerber & Eisenberg LLP

(57) ABSTRACT

An anchor assembly including a threaded anchor and a threaded drive pin positionable in the threaded anchor, a method of using or installing the anchor assembly to attach a fixture to a substrate, and a method of removing or un-installing the anchor assembly from the fixture and the substrate to detach the fixture from the substrate.

17 Claims, 13 Drawing Sheets

(56) References Cited

OTHER PUBLICATIONS

Fischer Nylon Hammerfix 6 X 60MM 50 Pack (28374), retrieved from the Internet at https://www.screwfix.com/p/fischer-nylon-hammerfix-6-x-60mm-50-pack/28374, on Mar. 29, 2019 (available prior to Nov. 1, 2018) (2 pages).

Hilti 5/16 in. x 2-1/2 in. Nylon Flat Head Philips Impact Anchors with Screw (50-Pack), retrieved from the Internet at https://www.homedepot.com/p/Hilti-5-16-in-x-2-1-2-in-Nylon-Flat-Head-Phillips-Impact-Anchors-with-Screw-50-Pack-260354/204692972, on Mar. 29, 2019 (available prior to Nov. 1, 2018) (4 pages).

Red Head® 1/4 in. x 3 in. Hammer-Set Nail Drive Concrete Anchors (25-Pack), retrieved from the Internet at https://www.Hammer-Set-Nail-Drive-Concrete-Anchors-25-Pack-35207/203064111, on Mar. 29, 2019 (avaiable prior to Nov. 1, 2018) (5 pages).

* cited by examiner

ANCHOR ASSEMBLY

PRIORITY

This application claims priority to and the benefit of U.S. Provisional Patent Application Ser. No. 62/589,241, filed Nov. 21, 2017, the entire contents of which are incorporated herein by reference.

BACKGROUND

Masonry structures are widely used throughout the construction industry. One type of masonry structure is a concrete structure (such as a concrete wall, a concrete floor, or a concrete ceiling). Such concrete structures are typically constructed from fluid concrete poured into a mold or other suitable formwork. After being pouring, the concrete cures and hardens to form the concrete structure. After a masonry structure such as a concrete structure is formed, known anchor assemblies are often used to attach fixtures (such as wood members) to the concrete structure. Aligned holes are often formed in the fixture and the concrete structure (such as by drilling) to facilitate use of these known anchor assemblies. Certain issues exist with various known anchor assemblies used to attach fixtures to masonry structures such as concrete structures.

One such known anchor assembly is generally shown in FIGS. 1 and 2. This generally illustrated anchor assembly is commercially sold by Illinois Tool Works Inc. (the assignee of the present patent application) under the HAMMER-SET trademark (which is also owned by Illinois Tool Works Inc.). This known anchor assembly 10 generally includes: (a) an anchor 20; and (b) a drive pin 30 positionable in the anchor 20. This known anchor assembly 10 is typically sold in the assembled position generally shown in FIG. 2 where the drive pin 30 is partially positioned in the anchor 20 and ready for use.

More specifically, this known anchor 20 includes: (a) a generally cylindrical elongated tubular body 21; and (b) a head 25 integrally connected to and extending from a first end of the tubular body 21. The body 21 includes a generally cylindrical outer wall 22 having a smooth outer surface and an inner surface (not shown). The body 21 also includes a plurality of independently movable or pivotable gripping arms 23a and 23b at a second end of the body 21 opposite the head 25. The gripping arms 23a and 23b have interior ramps (not shown) that are engagable by the drive pin 30 to cause the gripping arms 23a and 23b to move or pivot outwardly. The inner surface of the body 21 defines a longitudinally extending central channel (not shown) configured to receive the drive pin 30. The head 25 also defines a longitudinally extending central channel 26 and a recess 27. The drive pin 30 of the anchor assembly 10 generally includes: (a) a generally cylindrical elongated solid shank 31; and (b) a solid head 35 integrally connected to a first end of the shank 31.

Generally, to attach a fixture to a concrete structure, an installer positions the anchor assembly 10 in a hole in the fixture that is aligned with a hole in the concrete structure. At this point, the drive pin 30 is already partially positioned in the anchor 20 as mentioned above and as generally shown in FIG. 2. The drive pin 30 partially extends into the anchor 20 such that the tip 33 of the drive pin 30 (opposite the head 35 of the drive pin 30) is at or adjacent to a starting point of the interior ramps of the gripping arms 23a and 23b. The installer then uses a driving device such as a hammer (not shown) to drive the drive pin 30 further into the anchor 20. This causes the shank 31 of the drive pin 30 to engage the interior ramps to cause the gripping arms 23a and 23b to move or pivot outwardly. The gripping arms 23a and 23b engage the interior surface that defines the hole in the concrete structure to secure the anchor 20 to the concrete structure. The head 25 of the anchor engages the outer surface of the fixture to hold the fixture to the concrete structure. After being completely driven into the anchor 20, the head 35 of the drive pin 30 is positioned in the recess 27 in the head 25 of the anchor 20.

After such installation of this known anchor assembly 10, it is difficult to remove this anchor assembly 10 from the fixture and the concrete structure. For instance, if the fixture is not the correct fixture or is not correctly positioned relative to the concrete structure (or for some other reason), and the installed anchor assembly needs to be removed, it is difficult to remove this installed anchor assembly. In various situations, the installer may need to use a pry bar to remove the fixture from the concrete structure. This can cause damage to the fixture, damage to the concrete structure, and typically makes the anchor assembly unusable. This can also be relatively time consuming and relatively expensive.

Accordingly, there is a need to address the above issue.

SUMMARY

Various embodiments of the present disclosure provide an anchor assembly, a method of using or installing the anchor assembly to attach a fixture to a substrate (such as masonry structure), and a method of removing (or un-installing) the anchor assembly from the fixture and the substrate to detach the fixture from the substrate (such as the masonry structure). The anchor assembly of the present disclosure is easy to install and easy to remove. The anchor assembly and the methods of the present disclosure address and overcome the above described issues, and specifically reduce the likelihood of damage to the fixture and damage to the masonry structure if the anchor assembly needs to be removed from the fixture and the masonry structure.

In various embodiments, the present disclosure provides an anchor assembly including a threaded drive pin including: (a) a shank, (b) a head integrally connected to the shank, the head defining a mechanical engaging structure that is engageable by a tool to rotate the threaded drive pin, and (c) a helical thread formation integrally connected to and extending outwardly from the shank; and a threaded anchor including: (i) an elongated tubular body including an inner surface defining a longitudinally extending inner channel, the body including at least two independently movable or pivotable gripping arms, (ii) a head integrally connected to and extending from a first end of the body and including an inner surface that defines a longitudinally extending inner channel that is aligned with the longitudinally extending inner channel of the body, the head including a mechanical engaging structure engageable by a tool to rotate the threaded anchor, the head also defining a drive pin head receiving recess configured to receive the head of the threaded drive pin, and (iii) an external helical thread formation integrally connected to and extending outwardly from part of the elongated tubular body. Various embodiments of the present disclosure provide method of using or installing this anchor assembly and a method of removing (or un-installing) this anchor assembly.

In various other embodiments, the present disclosure provides an anchor assembly threaded anchor including: (i) an elongated tubular body including an inner surface defining a longitudinally extending inner channel configured to receive a shank of a threaded drive pin, the body including at least two independently movable or pivotable gripping arms, (ii) a head integrally connected to and extending from a first end of the body and including an inner surface that defines a longitudinally extending inner channel that is aligned with the longitudinally extending inner channel of the body, the head including a mechanical engaging structure engageable by an appropriate tool to rotate the threaded anchor, the head also defining a drive pin head receiving recess configured to receive a head of the threaded drive pin, and (iii) an external helical thread formation integrally connected to and extending outwardly from part of the body. Various embodiments of the present disclosure provide method of using or installing this anchor assembly threaded anchor and a method of removing (or un-installing) this anchor assembly threaded anchor.

Additional features and advantages of the present disclosure are described in, and will be apparent from, the following Detailed Description and the Figures.

DETAILED DESCRIPTION OF EXAMPLE EMBODIMENTS

Figure 1:
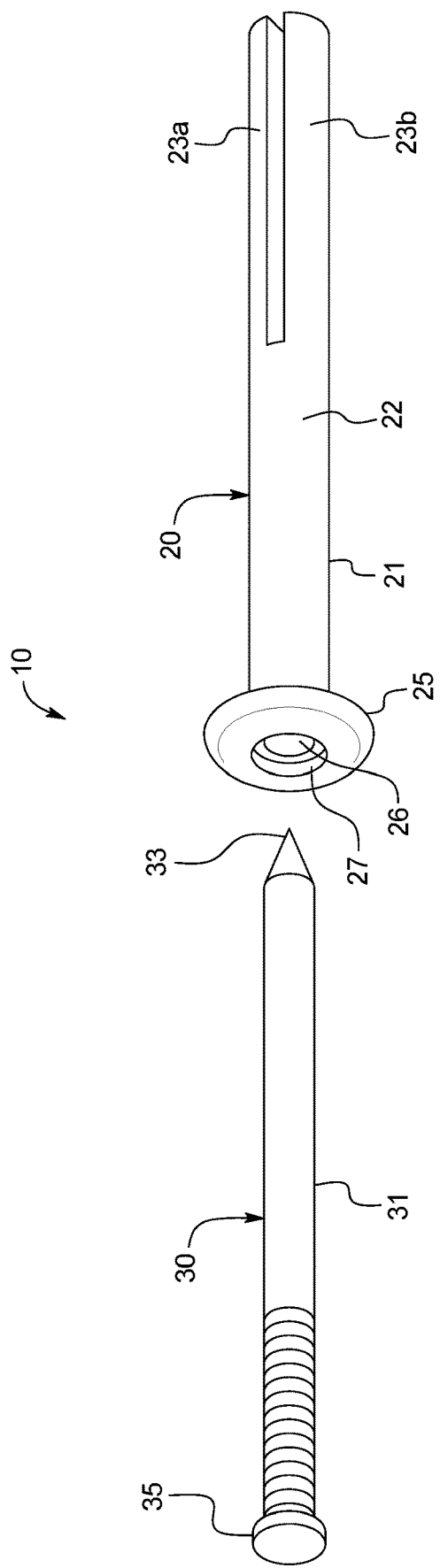
FIG. 1 is an exploded perspective view of a known anchor assembly.
Figure 2:
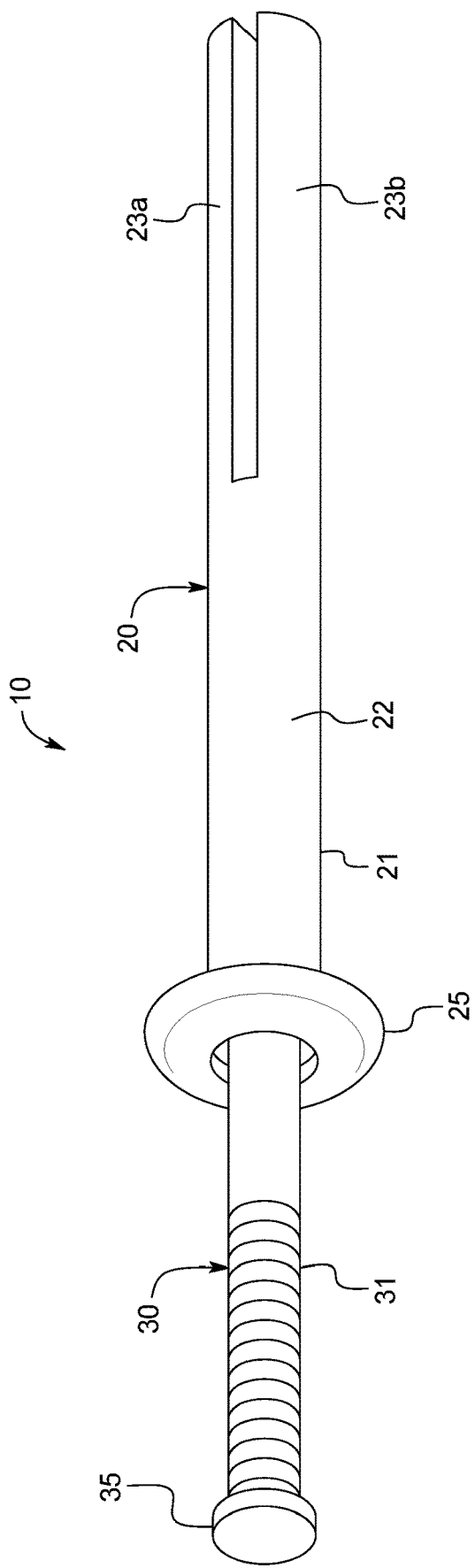
FIG. 2 is an assembled view of the known anchor assembly of FIG. 1.
Figure 3:
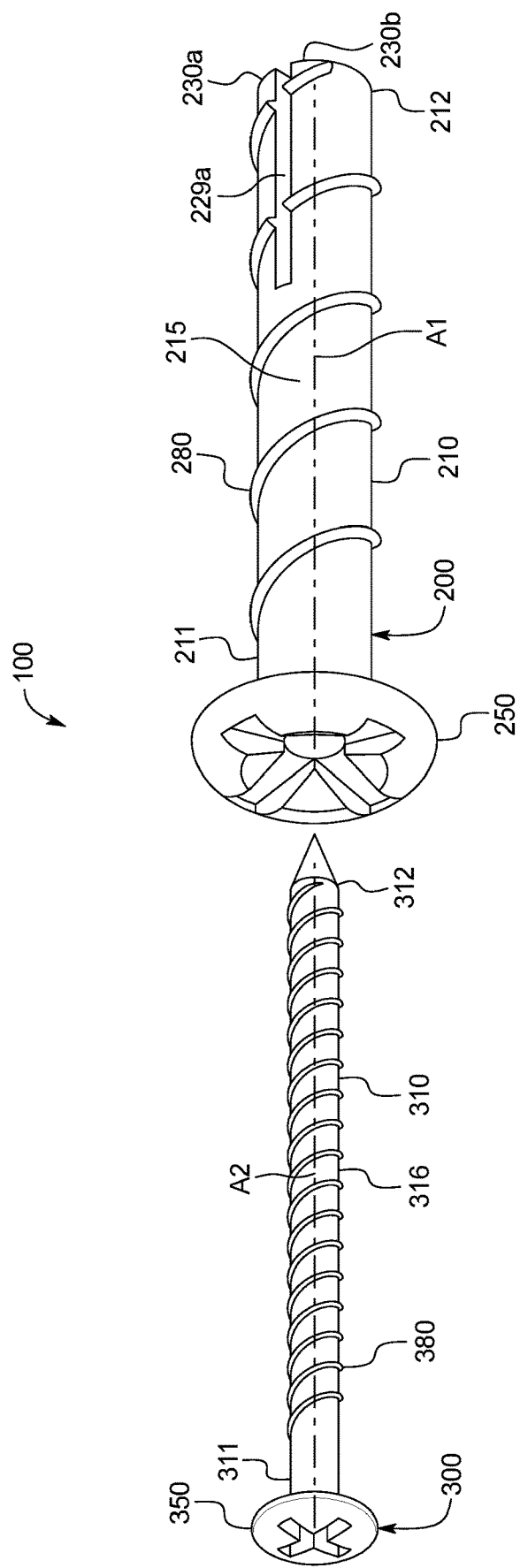
FIG. 3 is an exploded perspective view of an anchor assembly of one example embodiment of the present disclosure illustrating the threaded anchor and the threaded drive pin of the anchor assembly.
Figure 4:
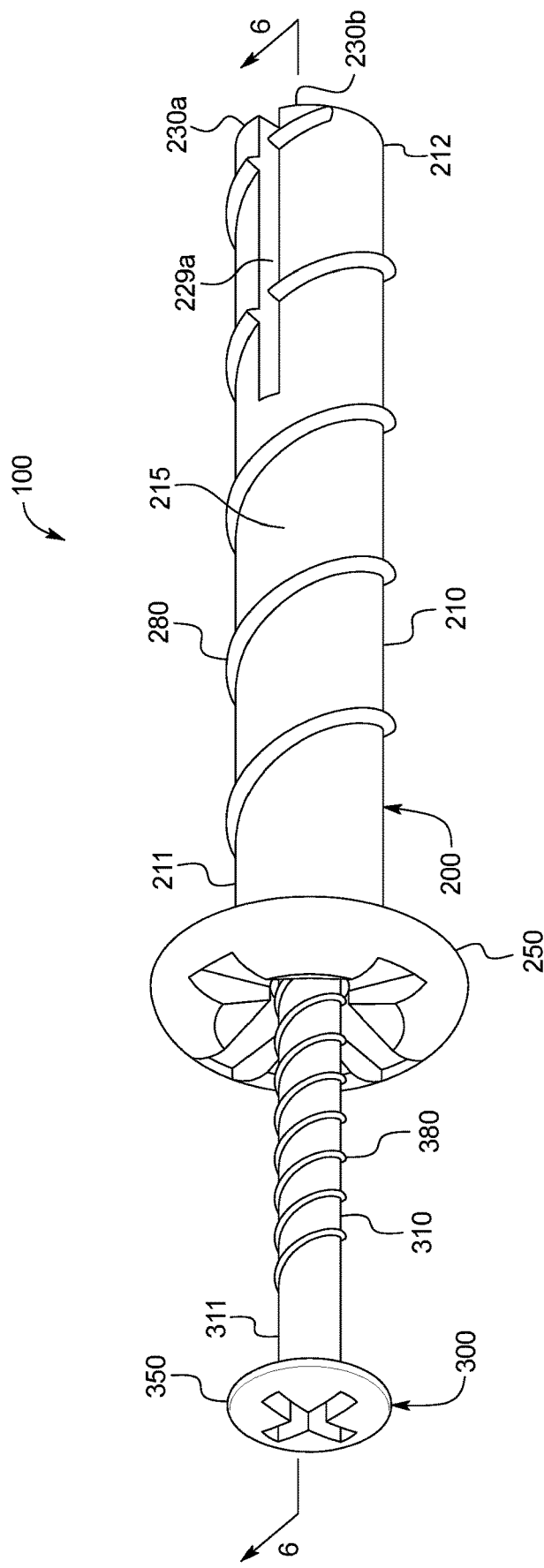
FIG. 4 is an assembled perspective view of the anchor assembly of FIG. 3 showing the threaded drive pin partially positioned in the threaded anchor and ready for use.

The present disclosure provides an anchor assembly, a method of using or installing the anchor assembly to attach a fixture to a substrate, and a method of removing or un-installing the anchor assembly from the fixture and the substrate to detach the fixture from the substrate.

One example embodiment of an anchor assembly of the present disclosure, a method of using or installing that example anchor assembly to attach a fixture to a substrate, and a method of removing or un-installing that anchor assembly from the fixture and the substrate to detach the fixture from the substrate are discussed below. It should be appreciated that the present disclosure is not limited to the example anchor assembly or example methods described below.

In various example embodiments, the fixture is a wood fixture such as a wood member or stud. It should be appreciated that the present disclosure is not limited to use with such example fixtures.

In various example embodiments, the substrate is a masonry structure, and more specifically the substrate is a concrete structure such as a concrete wall, concrete ceiling, or concrete floor. It should be appreciated that the present disclosure is not limited to use with such example substrates.

Referring now to FIGS. 2 to 13, example embodiments of an anchor assembly, an anchor assembly installing or installation method, and an anchor assembly removing or removal method of the present disclosure are generally illustrated. The anchor assembly of this illustrated example embodiment is generally indicated by numeral 100. The anchor assembly 100 generally includes: (a) an externally threaded anchor 200; and (b) an externally threaded drive pin 300 positionable in and removable from the externally threaded anchor 200.

More specifically, as best shown in FIGS. 3, 4, 5, 6, and 7, the externally threaded anchor 200 includes: (a) a cylindrical or substantially cylindrical elongated tubular hollow body 210; (b) a substantially mushroom shaped head 250 integrally connected to and extending from a first or top end 211 of the body 210; and (c) an external helical thread formation 280 integrally connected to and extending outwardly from part or a portion of the body 210. In this illustrated example embodiment, the threaded anchor 200 is a zinc/aluminum die cast part. However, it should be appreciated that the threaded anchor can be made from other suitable materials and in other suitable manners.

Figure 6:
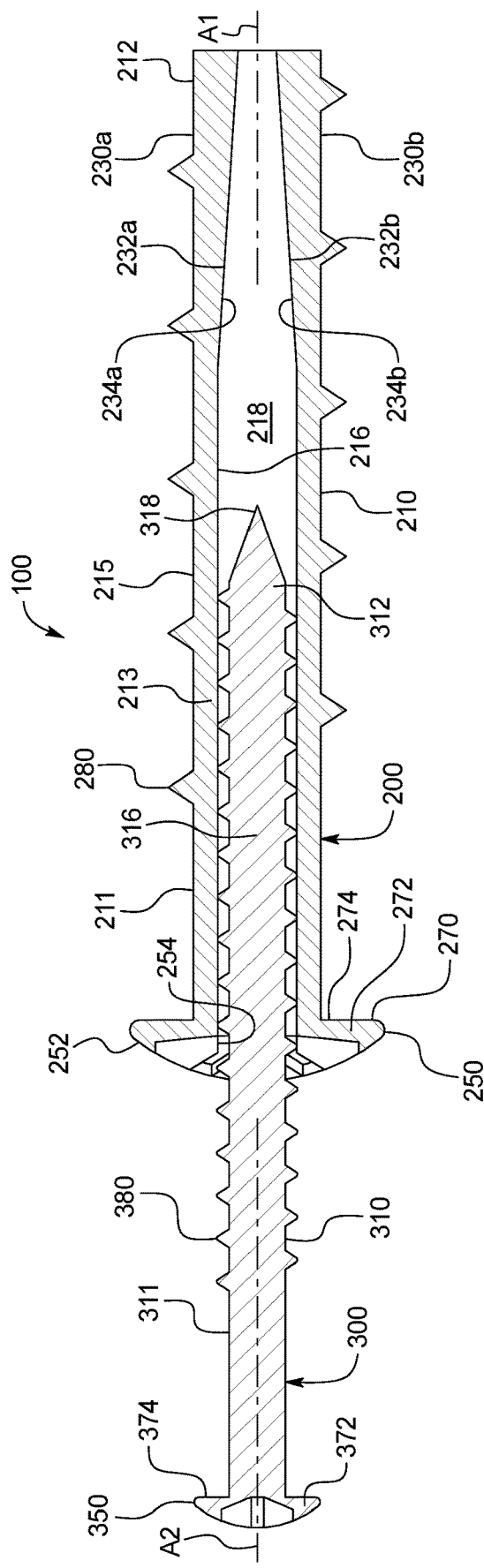
FIG. 6 is a cross sectional view of the anchor assembly of FIG. 3, taken substantially along line 6-6 of FIG. 4.

As best shown in FIG. 6, the body 210 includes a cylindrical or substantially cylindrical elongated wall 213 having: (a) an outer surface 215 having an outer diameter (not labeled); (b) an inner surface 216 having an inner diameter (not labeled); (c) a top end 211; and (d) a bottom end 212. The inner surface 216 of the body 210 defines a partially cylindrical longitudinally extending channel 218. The body 210 extends along or has a central longitudinal axis A1.

The body 210 defines two opposing longitudinally extending slots 229a and 229b (not shown) and includes two independently movable or pivotable gripping arms 230a and 230b at the second or bottom end 212 of the body 210. The gripping arms 230a and 230b respectively include internal ramps 232a and 232b. The internal ramps 232a and 232b respectively include sloped surfaces 234a and 234b. The gripping arms 230a and 230b, upon manufacture and prior to use of the anchor assembly 100 (i.e., prior to being spread apart), are in respective first positions shown in FIGS. 3, 4, 6, and 10. After installation of the anchor assembly 100 (i.e., after being spread apart), the gripping arms 230a and 230b are configured to be moved outwardly into respective second outwardly extending positions shown in FIGS. 5, 11, and 12 and as further described below. The pivotable gripping arms 230a and 230b in this illustrated example embodiment are identical or substantially identical. It should be appreciated that in other embodiments of the present disclosure, the gripping arms 230a and 230b do not need to be identical or substantially identical and that the quantity of gripping arms may vary.

Figure 7:
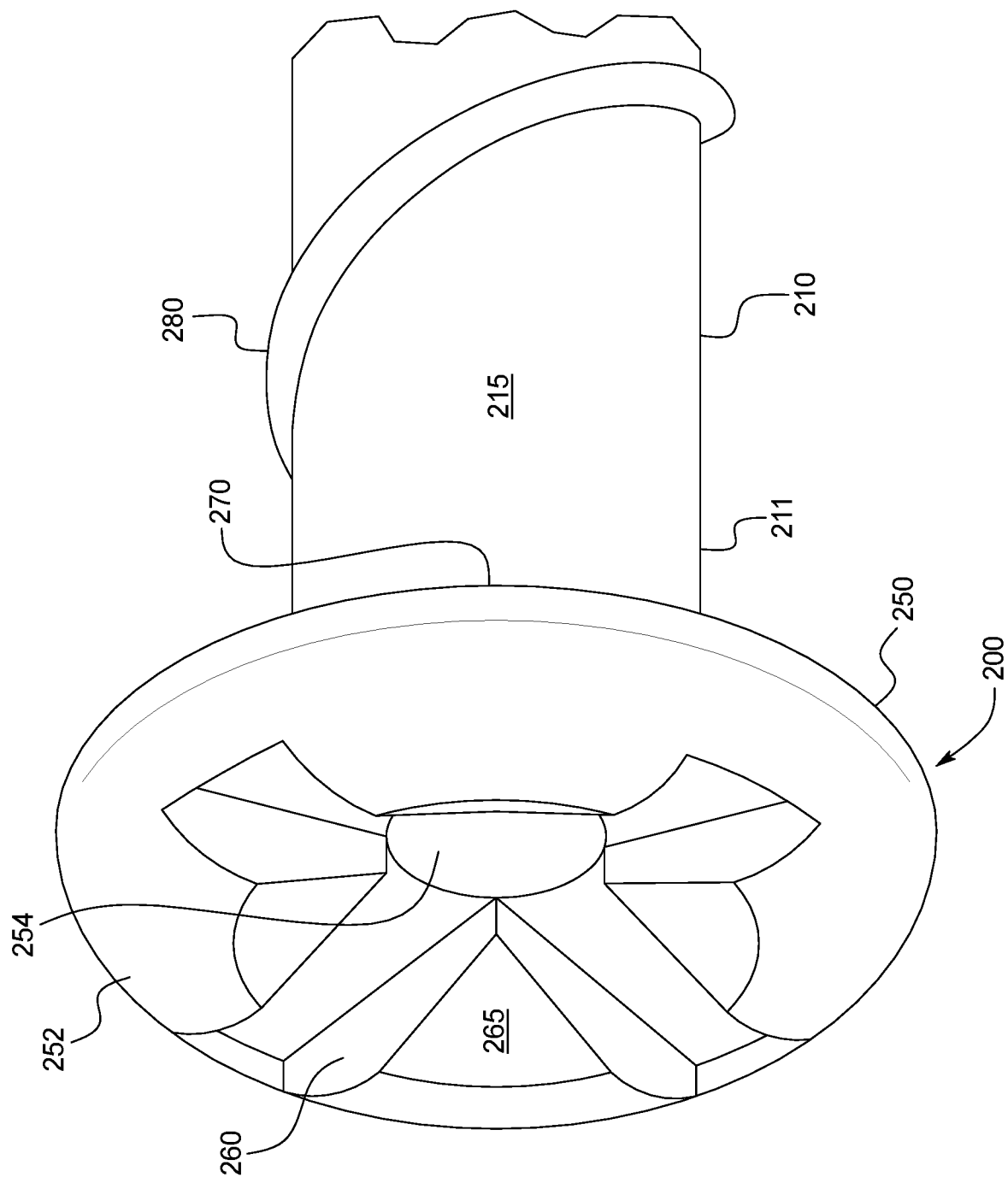
FIG. 7 is an enlarged fragmentary perspective view of the threaded anchor of the anchor assembly of FIG. 3, illustrating the head of the threaded anchor.
Figure 8:
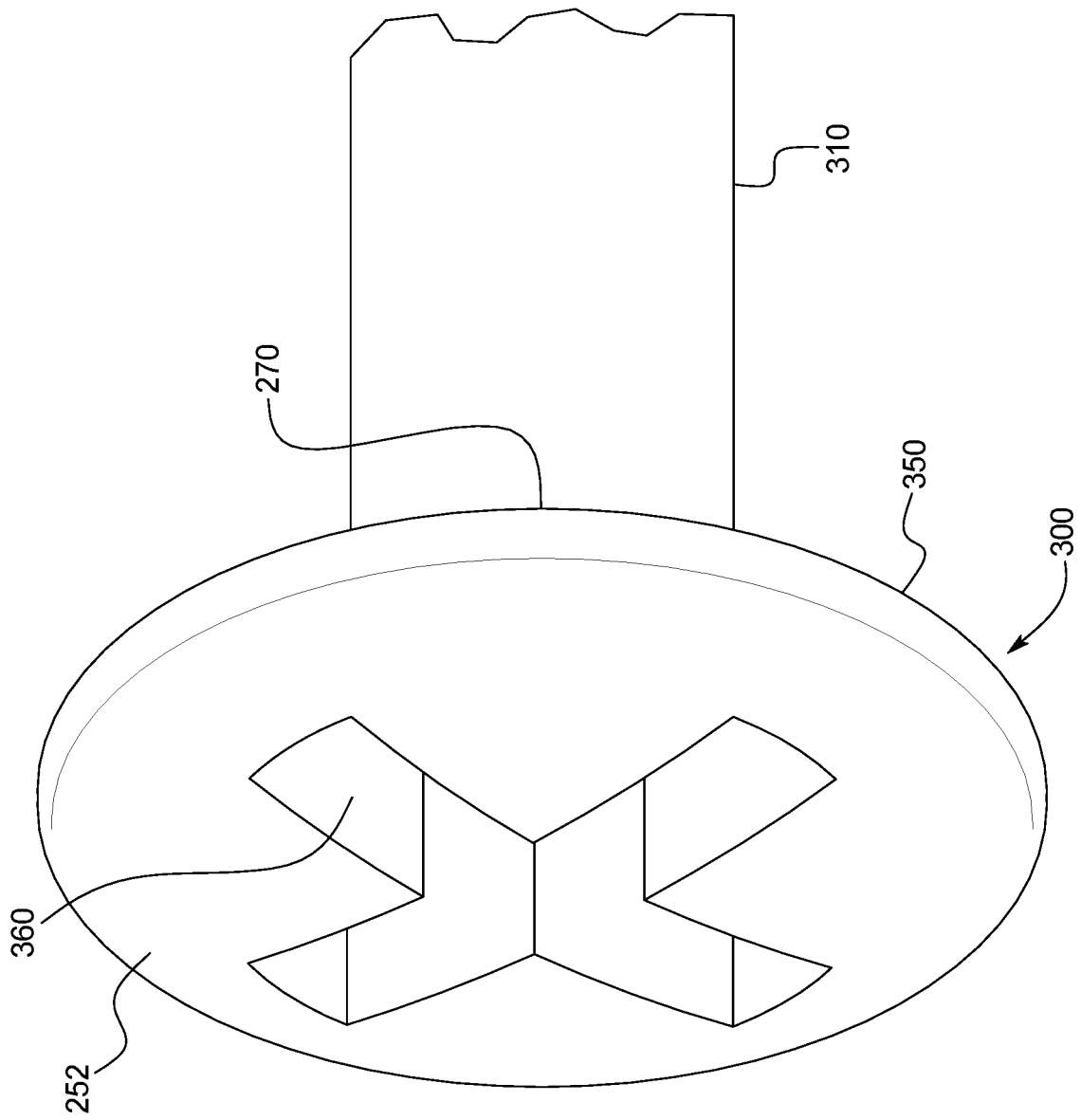
FIG. 8 is an enlarged fragmentary perspective view of the threaded drive pin of FIG. 3, illustrating the head of the threaded drive pin.

As best shown in FIGS. 6 and 7, the head 250 of the threaded anchor 200 includes: (a) a top portion 252 distal to and spaced from the first or top end 211 of the body 210; and (b) a bottom portion 270 proximate to and integrally connected to the first or top end 211 of the body 210. The head 250 includes a cylindrical or substantially cylindrical inner surface 254 that defines a longitudinally extending inner cylindrical or substantially cylindrical central channel (not labeled) that is aligned with the longitudinally extending channel 218 of the body 210. The head 250 extends along or has a central longitudinal axis from the top portion 252 to the bottom portion 280 that is aligned with or that extends along the same central longitudinal axis A1 of body 210.

The top portion 252 of the head 250 has a substantially convex shape and defines a mechanical engaging structure 260 that is engageable by an appropriate tool for rotating the threaded anchor 200 as further discussed below. In this illustrated example embodiment of the present disclosure, the mechanical engaging structure 260 includes a plurality of first walls (not labeled) having a plurality of first surfaces (not labeled) that define a cross-shaped slot or receiving formation (not labeled) configured to receive a conventional Phillips screwdriver head 500 (or the like) in a conventional manner such that the screwdriver head can engage these respective first surfaces that define the cross-shaped slot. It should be appreciated that in other embodiments of the present disclosure, other mechanical engaging structures may be utilized (such as but not limited to a straight slot engageable by a flathead screwdriver or a hexagonal shaped cavity engageable by an Allen wrench). Any suitable mechanical engaging may be employed as the engaging structure in accordance with the present disclosure.

Figure 5:
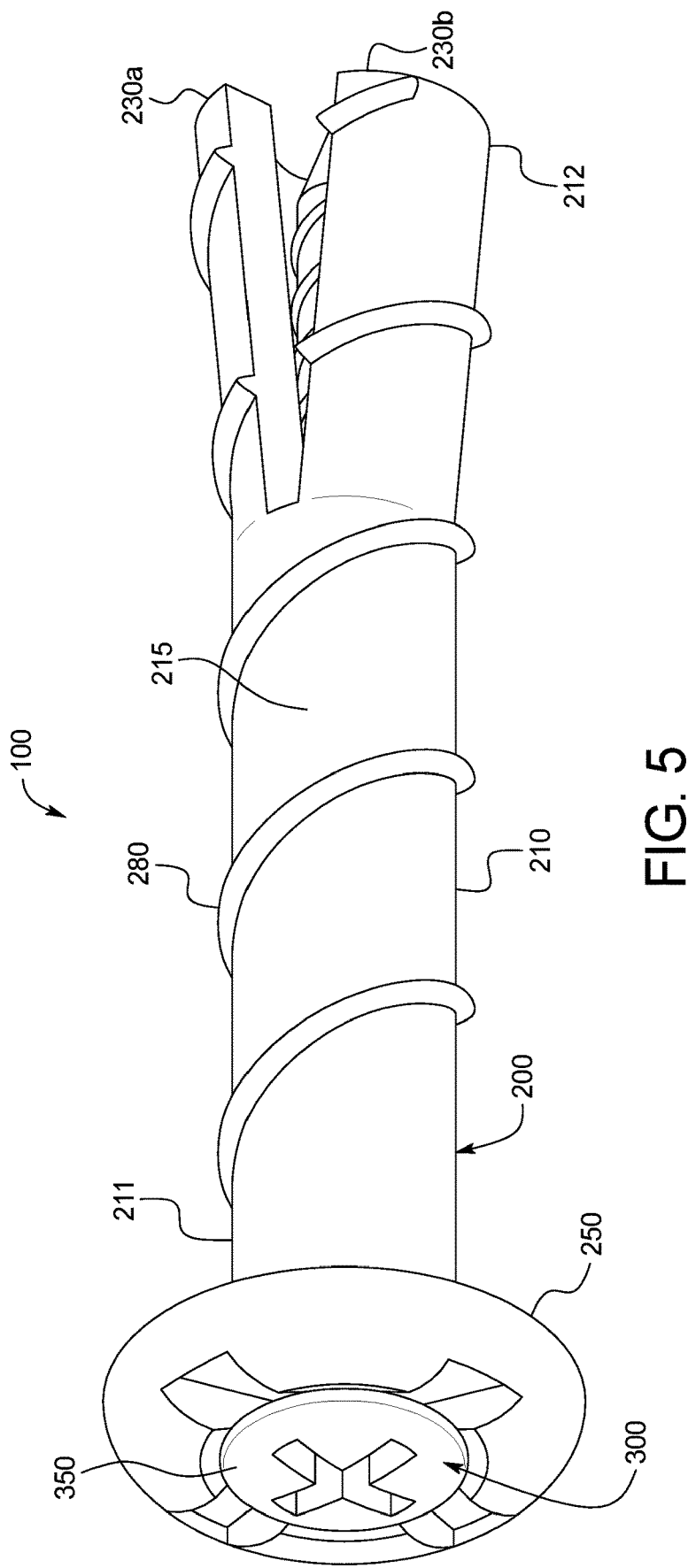
FIG. 5 is a perspective view of the anchor assembly of FIG. 3 after the threaded drive pin has been fully driven into the threaded anchor and the gripping arms have spread apart.
Figure 11:
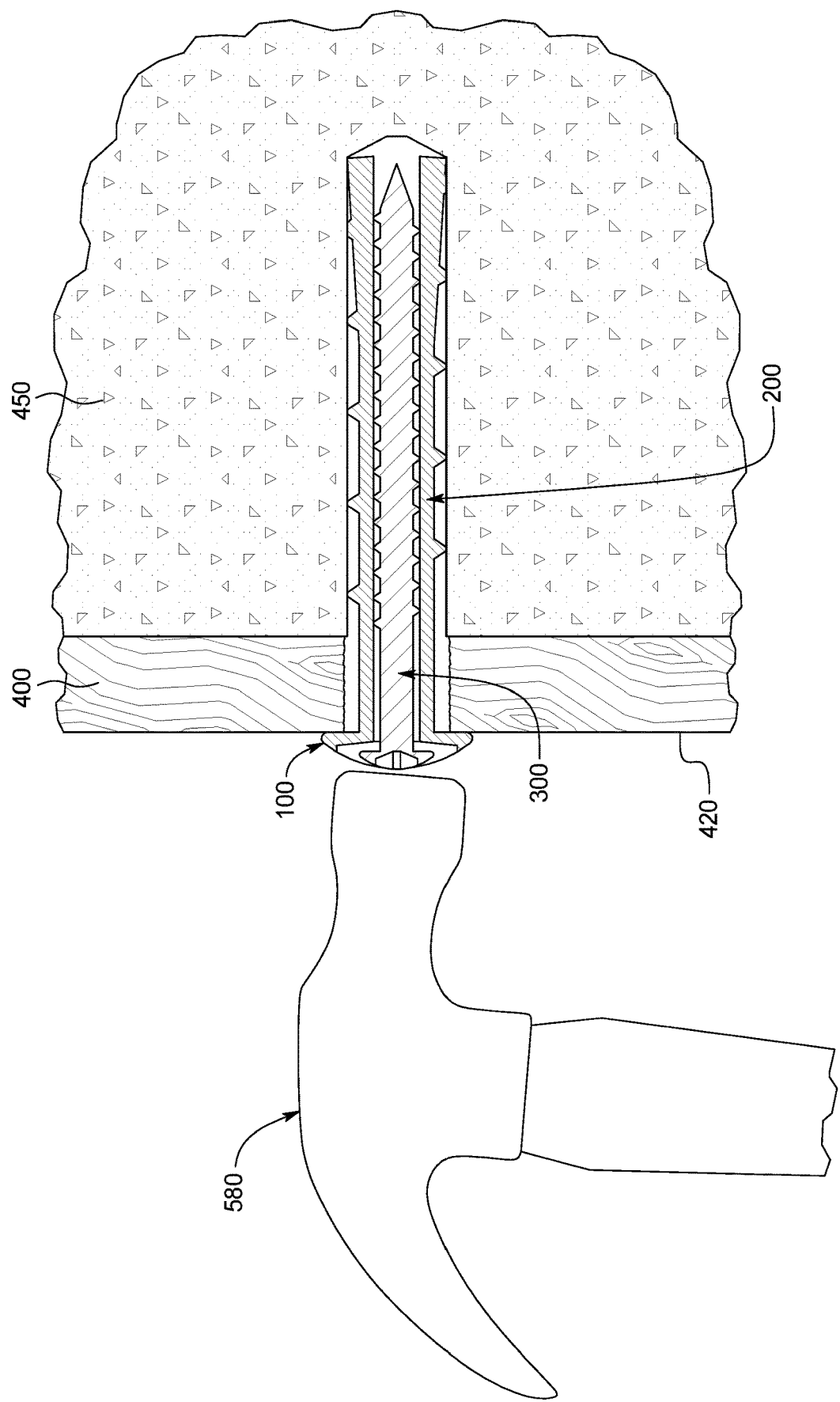
FIG. 11 is a cross sectional view of the threaded drive pin and threaded anchor of the anchor assembly of FIG. 3 shown fully inserted into the hole in the wood fixture and the hole in the concrete wall substrate, and wherein the threaded drive pin is fully positioned in the threaded anchor and the gripping arms of the threaded anchor are spread apart.

The top portion 252 of the head 250 also includes a plurality of different second walls (not labeled) having a plurality of second surfaces (not labeled) that define a drive pin head receiving recess 265 that is configured to receive the head 350 of the threaded drive pin 300 as further discussed below and as shown in FIGS. 5 and 11. Parts of the drive pin head receiving recess 265 overlap with parts of the recess defined by the mechanical engaging structure 260.

As best shown in FIGS. 6, 10, 11, 12, and 13, the bottom portion 270 of the head 250 includes a circular or substantially circular engagement wall 272 having a flat or generally flat engagement surface 274. The engagement surface 274 of the engagement wall 272 is configured to engage an outer surface 420 of a fixture 400 such as the example wood fixture 400 as generally shown in FIGS. 10, 11, 12, and 13. It should be appreciated that the bottom portion of the head may be alternatively configured in accordance with the present disclosure.

The external helical thread formation 280 that is integrally connected to and extends outwardly from the body 210 has a plurality of spaced apart thread sections that each have or form an outer edge or crest. The outer diameter of the helical thread formation (sometimes called the crest diameter) is greater than the outer diameter of the body 210. The external helical thread formation 280 has a relatively low profile or thread height. In this illustrated example embodiment, the helical thread formation 280 has a 0.02 inch thread height. In this illustrated example embodiment, the helical thread formation 280 has a 60 degree pitch angle. The pitch angle is the angle the thread sections are orientated relative to the horizontal (i.e., perpendicular to the thread length). In this illustrated example embodiment, the thread sections are spaced apart relatively far from each other. In other words, the distance from the crest of one thread section to the crest of an adjacent thread section is relatively far apart. In this illustrated example embodiment, the thread formation has about 3 threads or thread sections per 1 inch. In this illustrated example embodiment, the external helical thread formation 280 extends to the bottom end 212 of the body 210.

The external helical thread formation 280 generally serves two functions, and particularly is configured to: (a) facilitate frictional engagement with the surfaces that define the hole in the fixture (such as the wood member) and the surfaces that define the hole in the substrate (such as the concrete structure) to assist in maintaining the threaded anchor in the fixture and the substrate; and (b) when needed, facilitate removal (by rotational unscrewing) of the threaded anchor 200 from the fixture and the substrate as further discussed below.

Turning now to the threaded drive pin 300, as best shown in FIGS. 3, 4, 6, and 8, the threaded drive pin 300 generally includes: (a) a solid cylindrical or substantially cylindrical shank or body 310; (b) a solid substantially mushroom shaped head 350 integrally connected to the shank 310; and (c) a helical thread formation 380 integrally connected to and extending outwardly from the shank 310. In this illustrated example embodiment, the threaded drive pin 300 is a steel material. However, it should be appreciated that the threaded anchor can be made from other suitable materials and in other suitable manners. In this illustrated example embodiment, the threaded drive pin 300 is made from a harder material than the threaded anchor 200.

The shank or body 310 has: (a) a first section or end 311; (b) a second section or end 312; and (c) an intermediate or central section 316 between the first section or end 311 and the second section or end 312. The second section or end 312 of the shank 310 (that is opposite the first end 311 of the shank 310) includes or forms a tip or tip portion 318. The shank 310 has a length L1, and defines or has a central longitudinal axis A2 extending along the length L1 of the shank 310, generally from the head 350 to the tip or tip portion 318 of the shank 310. The tip or tip portion 318 is pointed in this illustrated example embodiment; however, it should be appreciated that in other embodiments the tip does not need to have such a point.

The head 350 of the threaded drive pin 300 includes: (a) a top portion 352 distal to and spaced from the shank 310; and (b) a bottom portion 370 proximate to and integrally connected to the shank 310.

The top portion 352 of the head 350 has a substantially convex shape and defines a mechanical engaging structure 360 that is engageable by an appropriate tool for rotating the threaded drive pin 300 as further discussed below. In this illustrated example embodiment of the present disclosure, the mechanical engaging structure 360 includes a plurality of first walls (not labeled) having a plurality of first surfaces (not labeled) that define a cross-shaped slot or receiving formation (not labeled) configured to receive a conventional Phillips screwdriver head 500 (or the like) in a conventional manner such that the screwdriver head can engage that respective surfaces that define the cross-shaped slot. It should be appreciated that in other embodiments of the present disclosure, other mechanical engaging structures may be utilized (such as but not limited to a straight slot engageable by a flathead screwdriver or a hexagonal shaped cavity engageable by an Allen wrench). Any suitable mechanical engaging may be employed as the engaging structure in accordance with the present disclosure.

Figure 12:
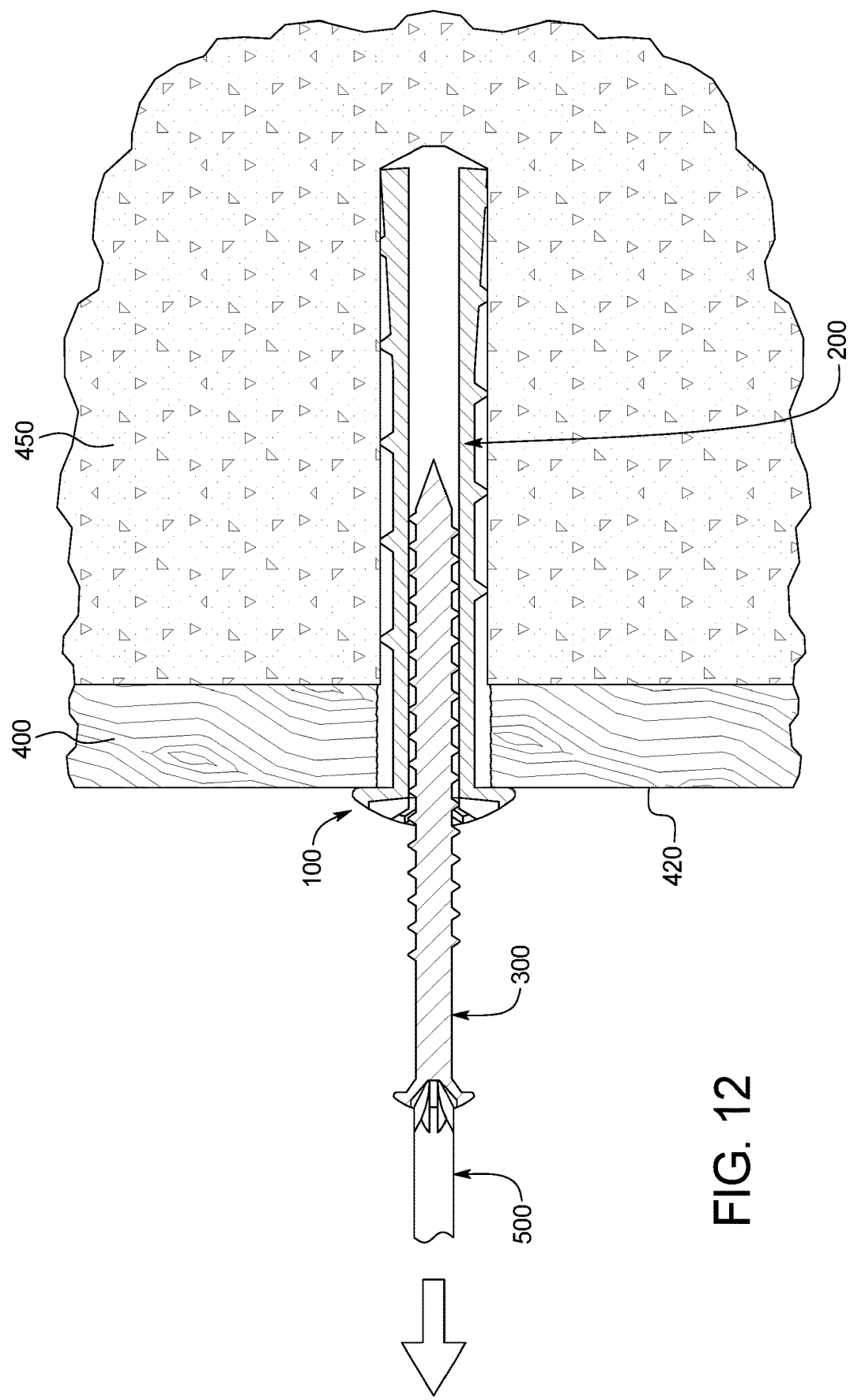
FIG. 12 is a cross sectional view of the threaded drive pin of the anchor assembly of FIG. 3 being removed (by counter-clockwise rotation) from the threaded anchor mounted in the wood fixture and the concrete wall substrate.
Figure 13:
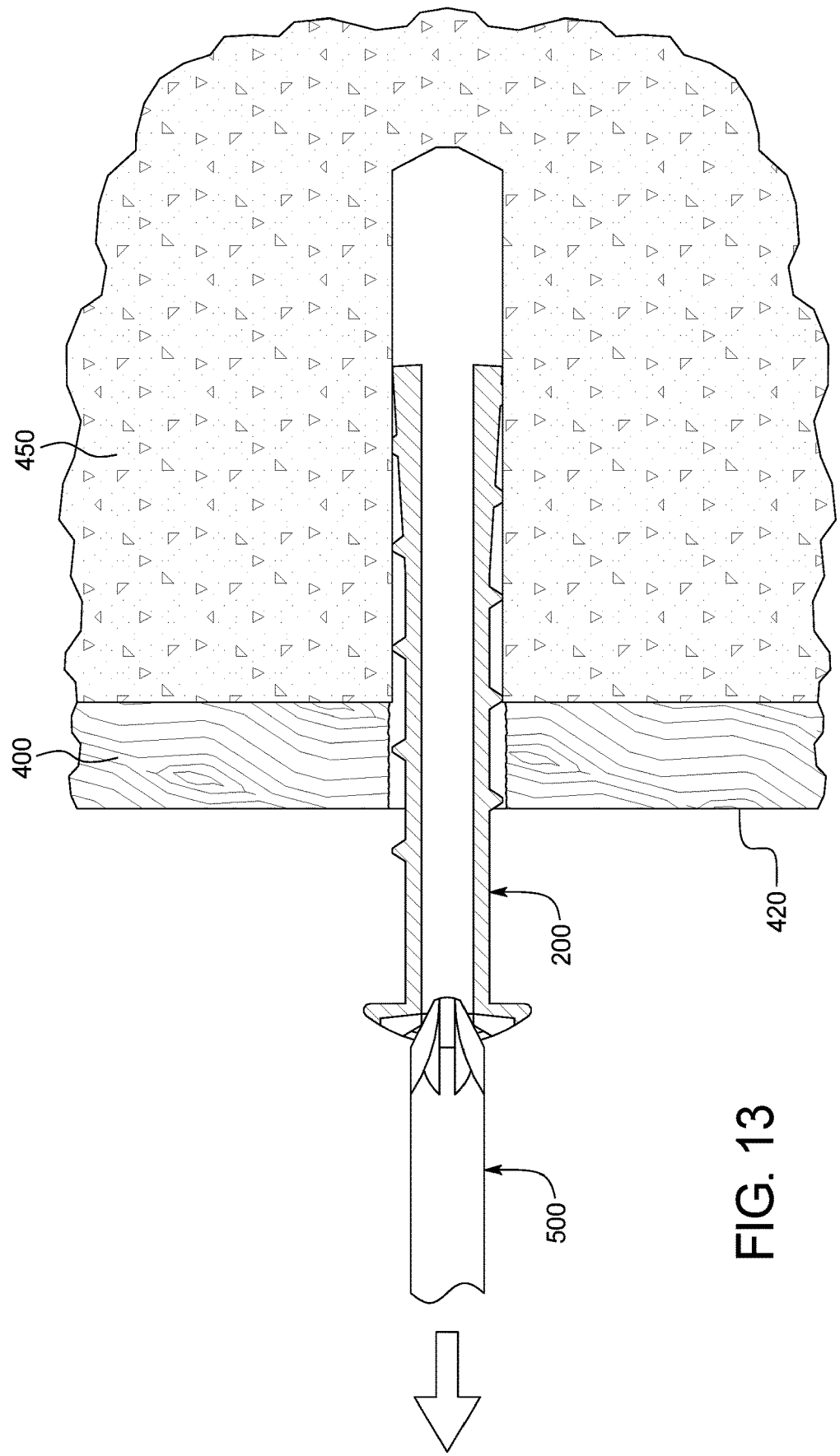
FIG. 13 is a cross sectional view of the threaded anchor of the anchor assembly of FIG. 3 being removed (by counter-clockwise rotation) from the hole in the wood fixture and from the hole in the concrete wall substrate.

It should be appreciated that in various embodiments of the present disclosure, the mechanical engaging structure 360 of the head 350 of the threaded drive pin 300 and the mechanical engaging structure 260 of the head 250 of the threaded anchor 200 are the same so that a single tool such as tool 500 shown in FIGS. 12 and 13 can be used to rotate and remove both the threaded drive pin 300 and the threaded anchor 200 when necessary.

The bottom portion 370 of the head 350 includes a circular or substantially circular engagement wall 372 (as shown in FIG. 6) having a flat or generally flat engagement surface 374. The engagement surface 374 of the engagement wall 372 is configured to engage the second surfaces of the second walls of the head 250 of the threaded anchor 200 that define the recess 265 in the head 250 as generally shown in FIGS. 5 and 11. It should be appreciated that the bottom portion 370 of the head 350 may be alternatively configured in accordance with the present disclosure.

The helical thread formation 380 extends along and outwardly or transversely from the central section 316 of the shank 310 in this illustrated example embodiment of this present disclosure. The first end 311 of the shank 310 does not include the helical thread formation 380 in this illustrated example embodiment. The tip 318 of the second end 312 of the shank 310 also does not include the helical thread formation 380 in this illustrated example embodiment. It should be appreciated that the formation and configuration of the thread formation may take on a variety of different forms in accordance with the present disclosure.

The external helical thread formation 380 that is integrally connected to and extends outwardly from the body 310 has a plurality of spaced apart thread sections that each have or form an outer edge or crest. The outer diameter of the helical thread formation (sometimes called the crest diameter) is greater than the outer diameter of the body 310. The external helical thread formation 380 has a relatively low profile or thread height. In this illustrated example embodiment, the helical thread formation 280 has a 0.01 inch thread height. In this illustrated example embodiment, the helical thread formation 380 is partially asymmetrical. In this illustrated example embodiment, the thread sections are spaced relatively close together. In this illustrated example embodiment, the thread formation has about 10 threads or thread sections per 1 inch. In this illustrated example embodiment, the external helical thread formation 280 extends close to the tip portion 312 of the body 310.

The external helical thread formation 380 generally serves two functions, and particularly is configured to: (a) facilitate frictional engagement with the surfaces that define the central channel in the threaded anchor 200 to assist in maintaining the threaded drive pin 300 in the threaded anchor 200; and (b) configured to facilitate removal (by rotational unscrewing) of the threaded drive pin 300 from the threaded anchor 200 so that the threaded anchor 200 can subsequently be removed from the fixture and the substrate as further discussed below.

The outer diameter of the thread formation 380 of threaded drive pin 300 is about the same size or slightly smaller than the inner diameter of the body 210 of the threaded anchor 200. In certain embodiments, when the threaded drive pin 300 is driven into the threaded anchor 200, the helical thread formation 380 is configured to scrape the inside surfaces of the threaded drive pin 300 and thus provide suitable frictional engagement between the threaded drive pin 300 and the threaded anchor 200.

The shank 310 and the helical thread formation 280 are configured to fit through the aligned central channels defined in the head 250 and body 210 of the threaded anchor 200 as generally shown in FIGS. 4, 6, 10, 11, and 12.

One example method of the present disclosure of using or installing the above described example anchor assembly 100 to attach a fixture to a substrate, and one example method of the present disclosure for removing or un-installing the above described example anchor assembly 100 from the fixture and the substrate to detach the fixture from the substrate are illustrated in FIGS. 9, 10, 11, 12, and 13 and are discussed below. These examples use a wood member 400 as the fixture and a concrete wall 450 as the substrate; although it should be appreciated that the methods of the present disclosure are not limited to such example fixtures and such example substrates.

Figure 9:
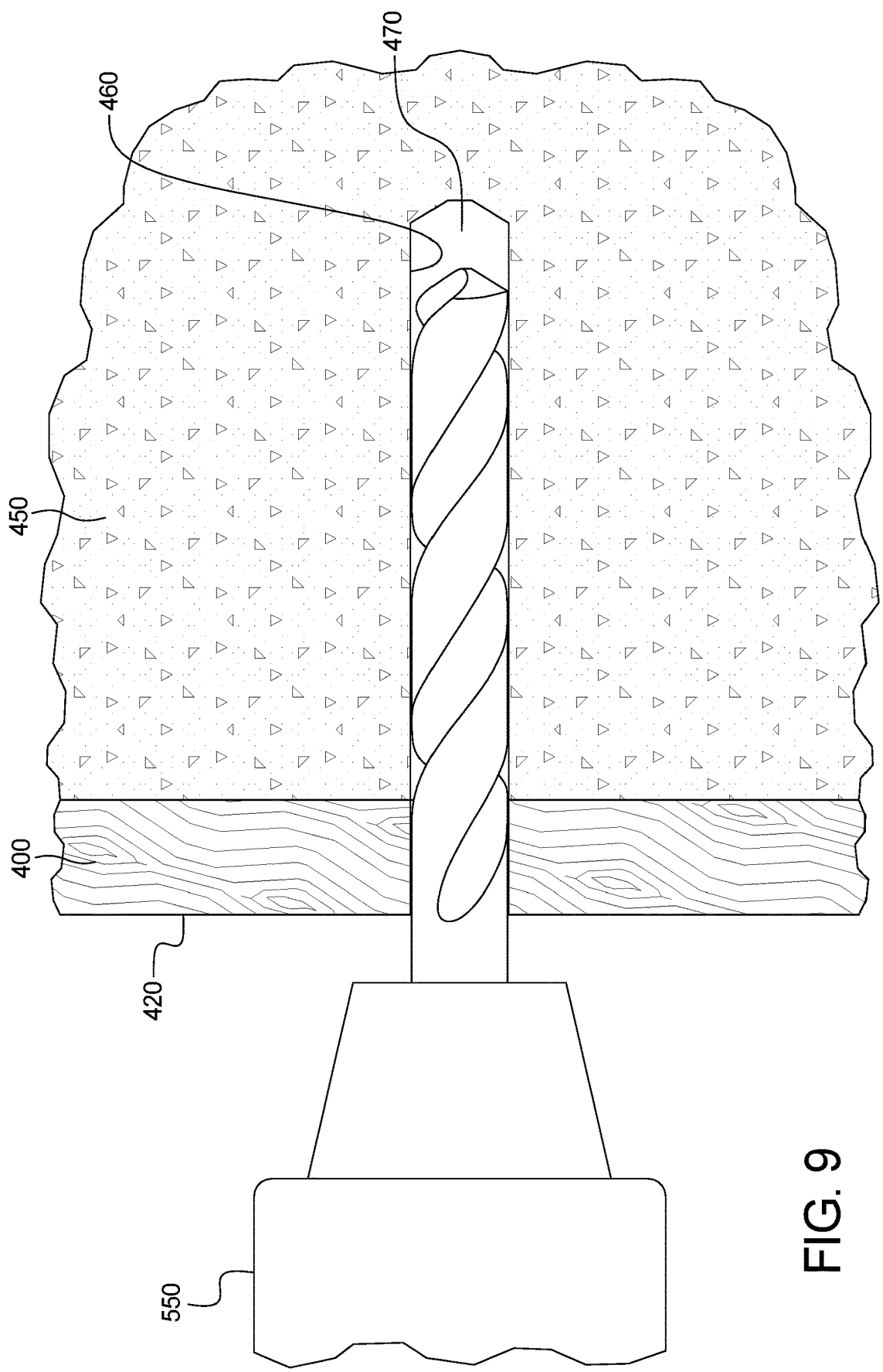
FIG. 9 is a partial cross sectional view of a drill (shown in fragmentary) forming a hole in an example wood fixture (shown in fragmentary) and an aligned hole in an example concrete wall substrate (shown in fragmentary).

Generally, as generally shown in FIG. 9, to attach the wood member 400 to the concrete wall 450 using an anchor assembly of the present disclosure such as example anchor assembly 100, the installer positions the wood member fixture 400 up against or adjacent to the concrete wall substrate 450 and uses a drill 550 to drill aligned holes in the wood member fixture 400 and the concrete wall substrate 450. The installer may clean out the holes in any suitable manner if needed.

Figure 10:
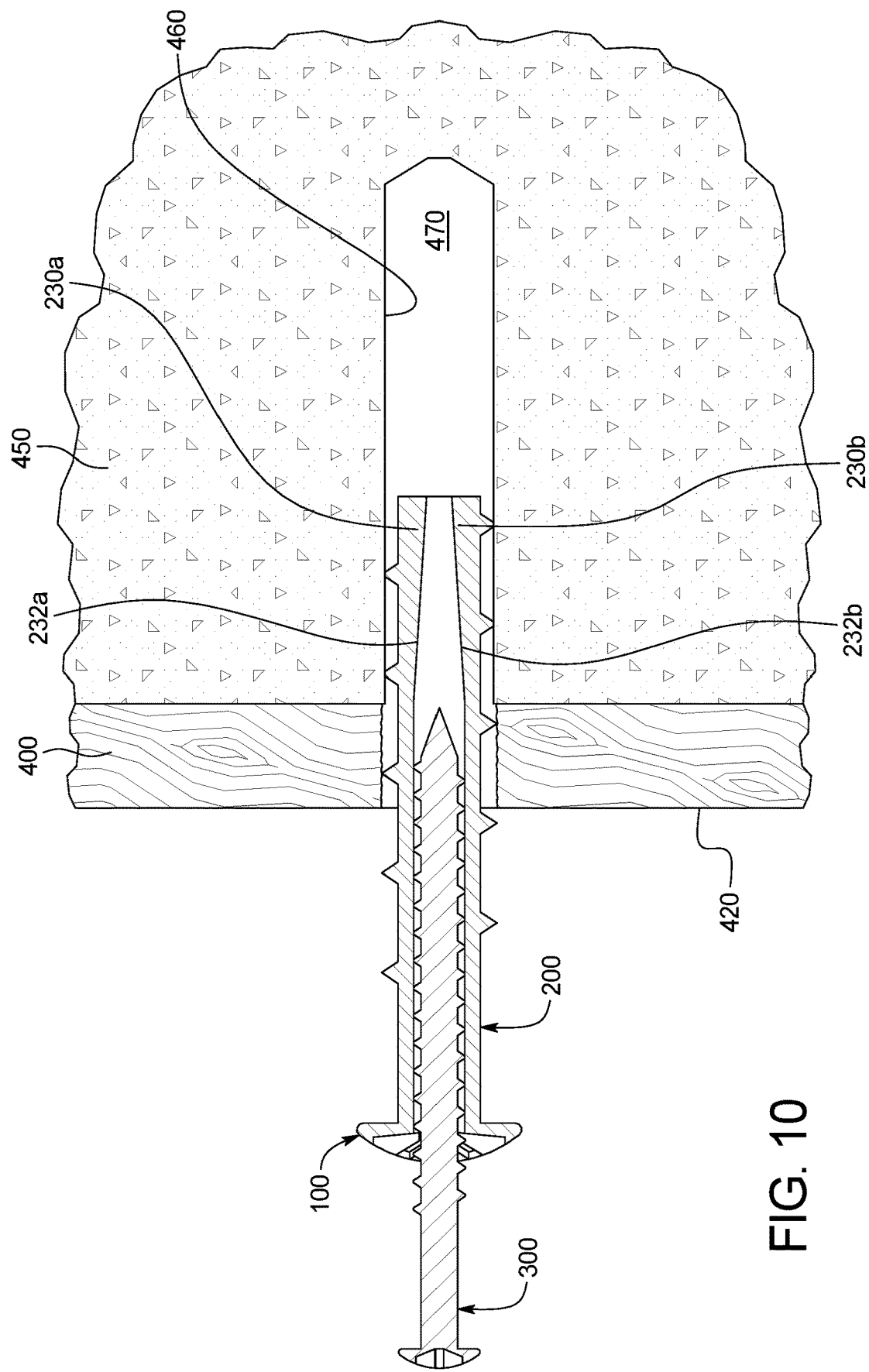
FIG. 10 is a cross sectional view of the threaded drive pin and the threaded anchor of the anchor assembly of FIG. 3 shown inserted through the hole in the wood fixture and partially into the hole in the concrete wall substrate.

As generally shown in FIG. 10, the installer then positions the anchor assembly 100 through the hole in the wood member fixture 400 and partially in the hole 470 in the concrete wall substrate 450. At this point, the threaded drive pin 300 is partially positioned in the threaded anchor 200 as generally shown in FIG. 10. This is a partially assembled position where the threaded drive pin 300 is partially in the threaded anchor 200 such that the tip or tip portion 318 of the threaded drive pin 300 (opposite the head 350) is at or adjacent to the starting point of the interior ramps 232a and 232b of the gripping arms 230a and 230b as generally shown in FIG. 10.

In this example embodiment, the installer uses a driving device (such as a hammer 580) to further drive the threaded drive pin 300 further into the threaded anchor 200 as generally shown in FIG. 11.

In other example embodiments, the installer can use a rotating device such as screw head 500 (see FIGS. 12 and 13) to rotate the threaded drive pin 300 and the threaded anchor 200 into the hole in the wood member fixture 400 and the hole 470 in the concrete wall substrate 450. In other example embodiments, the installer can use a rotating device such as screw head 500 to first rotate the threaded anchor 200 into the hole in the wood member fixture 400 and the hole 470 in the concrete wall substrate 450, and then rotate the threaded drive pin 300 into the threaded anchor 200 that extends through the hole in the wood member fixture 400 and the hole 470 in the concrete wall substrate 450.

This driving of the threaded drive pin 300 causes the threaded drive pin 300 to engage the interior ramps 232a and 232b to cause the gripping arms 223a and 223b to move or pivot outwardly. The outwardly extending gripping arms 223a and 223b engage the interior surface 460 that defines the hole 470 in the concrete wall substrate 450 to secure the threaded anchor 200 to the concrete wall substrate 450. In other words, when the threaded anchor 200 is installed in the hole 470 and threaded drive pin 300 is driven inwardly, the threaded drive pin 300 engages the ramps 232a and 232b to move the gripping arms 230a and 230b outwardly and thus spread the gripping arms 230a and 230b apart or away from one another to grip the inner surfaces 412 that define the hole 470 as generally shown in FIG. 11.

In this driven in position, the head 250 of the threaded anchor 200 engages the outer surface 420 of the wood member fixture 400 to hold the wood member fixture 400 to the concrete wall substrate 450 as shown in FIG. 11.

The threads or thread formation 280 of the threaded anchor 200 when hammered into the hole in the concrete wall substrate 450 will deform/flatten slightly as shown in FIGS. 10, 11, 12, and 13 (because the concrete wall substrate 450 is harder than the threaded anchor 200). The threads or thread formation 280 of the threaded anchor 200 will retain enough of their shape to enable removal using a counter-clockwise turning motion using a hand tool or a power tool.

The threads or thread formation 380 of the threaded drive pin 300 when hammered into the threaded anchor 200 will tend not to deform or flatten slightly as shown in FIGS. 10, 11, 12, and 13 (because the threaded drive pin 300 is harder than the threaded anchor 200). The threads or thread formation 380 of the threaded drive pin 300 will thus enable removal using a counter-clockwise turning motion using a hand tool or a power tool.

After being completely driven into the threaded anchor 200, the head 350 of the threaded drive pin 300 is positioned in the recess 264 in the head 250 of the threaded anchor 200 as shown in FIGS. 5 and 11.

After such installation of this anchor assembly 100, it is relatively easy to remove this anchor assembly 100 from the wood member fixture 400 and the concrete wall substrate 450. For instance, if the wood member fixture 400 is not the correct fixture or is not correctly positioned relative to the concrete wall 450, and the installed anchor assembly 100 needs to be removed, the installer can use a suitable tool 500 to remove the threaded drive pin 300 and then the threaded anchor 200 relatively quickly and thus relatively inexpensively as generally shown in FIGS. 12 and 13.

More specifically, the installer can use a suitable tool such as a Philips screwdriver head 500 to engage the head 350 of the threaded drive pin 300 to rotate the threaded drive pin 300 and remove it from the threaded anchor 200 as generally shown in FIG. 12.

The installer can then use the same suitable tool such as a Philips screwdriver head 500 to engage the head 250 of the threaded anchor 200 to rotate the threaded anchor 200 and remove it from the wood member 400 and the concrete wall 450 as generally shown in FIG. 13.

It should be appreciated that the compression forces on the threaded anchor 200 and the threaded drive pin 300 from the concrete wall substrate 450 will assist in facilitating the removal of the threaded drive pin 300 from the threaded anchor 200, and the threaded anchor 200 from the concrete wall substrate 450 as well as the wood member fixture 400.

Thus, this removal process does not require the installer to use a pry bar against the wood fixture 400 to remove the anchor assembly 100 from the concrete wall 450 and the wood fixture 400, and thus avoids or reduced the likelihood of damage to the fixture and the concrete wall. Additionally, in certain instances the removed anchor assembly 100 is re-usable (if it has not been weakened).

As mentioned above, in various embodiments, the threaded drive pin 300 is made from a harder material than the threaded anchor 200 and is thus better configured to cause the gripping arms 230a and 230b to spread apart to engage the surface 460 that defines the hole 470 in the substrate 450.

It should be appreciated that in various embodiments the threaded drive pin 300 can be configured to continually exert outward pressure on the inner sloped surfaces 234a and 234b of the griping arms 230a and 230b.

It should be appreciated that either or both of the threaded drive pin and the threaded anchor of the present disclosure can include one or more additional helical threads or thread formations in accordance with the present disclosure. It should also be appreciated that the one or more helical threads or thread formations may have any suitable appropriate: (a) number of helical threads; (b) size; (c) orientation; (d) pitch; (e) spacing; and/or (f) configuration.

It should be further appreciated that in various alternative embodiments, either or both of the thread formations may be left-handed (instead of right-handed as generally shown).

It should be appreciated from the above that various embodiments of the present disclosure provide an anchor assembly comprising: a threaded drive pin including: (a) a shank, (b) a head integrally connected to the shank, the head defining a mechanical engaging structure to enable rotation of the threaded drive pin, and (c) a helical thread formation integrally connected to and extending outwardly from the shank; and a threaded anchor including: (i) an elongated tubular body including an inner surface defining a longitudinally extending inner channel, the body including at least two independently movable or pivotable gripping arms, (ii) a head integrally connected to and extending from a first end of the body and including an inner surface that defines a longitudinally extending inner channel that is aligned with the longitudinally extending inner channel of the body, the head including a mechanical engaging structure to enable rotation of the threaded anchor, the head also defining a drive pin head receiving recess configured to receive the head of the threaded drive pin, and (iii) an external helical thread formation integrally connected to and extending outwardly from part of the body.

In various such embodiments of the anchor assembly, the mechanical engaging structure of the head of the threaded drive pin and the mechanical engaging structure of the head of the threaded anchor are engageable by a same tool.

In various such embodiments of the anchor assembly, the independently movable or pivotable gripping arms each include an interior ramp.

In various such embodiments of the anchor assembly, the threaded drive pin is made from a harder material than the threaded anchor.

It should also be appreciated from the above that various embodiments of the present disclosure provide an anchor assembly threaded anchor comprising: (i) an elongated tubular body including an inner surface defining a longitudinally extending inner channel configured to receive a shank of a threaded drive pin, the body including at least two independently movable or pivotable gripping arms; (ii) a head integrally connected to and extending from a first end of the body and including an inner surface that defines a longitudinally extending inner channel that is aligned with the longitudinally extending inner channel of the body, the head including a mechanical engaging structure to enable rotation of the threaded anchor, the head also defining a drive pin head receiving recess configured to receive a head of the threaded drive pin; and (iii) an external helical thread formation integrally connected to and extending outwardly from part of the body.

In various such embodiments of the anchor assembly threaded anchor, the mechanical engaging structure of the head of the threaded anchor is configured to be engage by a same tool as the head of the threaded drive pin.

In various such embodiments of the anchor assembly threaded anchor, the independently movable or pivotable gripping arms each include an interior ramp.

It should also be appreciated from the above that various embodiments of the present disclosure provide a method of installing and removing an anchor assembly, said anchor assembly including a threaded drive pin including: (a) a shank, (b) a head integrally connected to the shank, the head defining a mechanical engaging structure to enable rotation of the threaded drive pin, and (c) a helical thread formation integrally connected to and extending outwardly from the shank; and a threaded anchor including: (i) an elongated tubular body including an inner surface defining a longitudinally extending inner channel, the body including at least two independently movable gripping arms, (ii) a head integrally connected to and extending from a first end of the body and including an inner surface that defines a longitudinally extending inner channel, the head including a mechanical engaging structure to enable rotation of the threaded anchor, the head also defining a drive pin head receiving recess configured to receive the head of the threaded drive pin, and (iii) an external helical thread formation integrally connected to and extending outwardly from part of the body, said method comprising: aligning a first object and a second object such that a first hole in the first object is aligned with a second hole in the second object; positioning the anchor assembly through the first hole partially into the second hole and such that the threaded drive pin is partially positioned in the threaded anchor; driving the threaded drive pin further into the threaded anchor causing the threaded drive pin to engage the interior ramps to cause the gripping arms to move outwardly to engage an interior surface that defines the second hole in the second object to secure the threaded anchor to the second object; causing a tool to engage the mechanical engaging structure of the head of the threaded drive pin and rotating the tool to rotate the threaded drive pin to remove the threaded drive pin from the threaded anchor; and causing the tool to engage the mechanical engaging structure of the head of the threaded anchor and rotating the tool to rotate the threaded anchor to remove the threaded anchor from the first object and the second object.

In various such embodiments, driving the threaded drive pin includes partially deforming the threads of the drive pin.

It will be understood that modifications and variations may be effected without departing from the scope of the novel concepts of the present invention, and it is understood that this application is to be limited only by the scope of the claims.

The invention is claimed as follows:

1. An anchor assembly comprising:
   an externally threaded drive pin including:
      a shank,
      a head integrally connected to the shank, the head defining a mechanical engaging structure to enable rotation of the externally threaded drive pin, and
      an external helical thread formation integrally connected to and extending outwardly from the shank; and an externally threaded anchor including:
      an elongated tubular body including an inner surface defining a longitudinally extending inner channel, the body including at least two independently movable gripping arms, wherein the inner surface of the elongated tubular body is without internal threads,
      a head integrally connected to and extending from a first end of the body and including an inner surface that defines a longitudinally extending inner channel that is aligned with the longitudinally extending inner channel of the body, the head including a plurality of first surfaces defining a mechanical engaging structure to enable rotation of the externally threaded anchor, wherein the inner surface of the head is without internal threads, the head also including a plurality of second surfaces defining a drive pin head receiving recess configured to receive the head of the externally threaded drive pin, and
      an external helical thread formation integrally connected to and extending outwardly from part of the body.

2. The anchor assembly of claim 1, wherein the mechanical engaging structure of the head of the externally threaded drive pin and the mechanical engaging structure of the head of the externally threaded anchor are engageable by a same tool.

3. The anchor assembly of claim 1, wherein the independently movable gripping arms each include an interior ramp.

4. The anchor assembly of claim 1, wherein the externally threaded drive pin is made from a harder material than the externally threaded anchor.

5. An anchor assembly externally threaded anchor comprising:
   an elongated tubular body including an inner surface defining a longitudinally extending inner channel configured to receive a shank of an externally threaded drive pin, the body including at least two independently movable gripping arms, wherein the inner surface of the elongated tubular body is without internal threads;
   a head integrally connected to and extending from a first end of the body and including an inner surface that defines a longitudinally extending inner channel that is aligned with the longitudinally extending inner channel of the body, wherein the inner surface of the head is without internal threads, the head including a plurality of first surfaces defining a mechanical engaging structure to enable rotation of the externally threaded anchor, the head also including a plurality of second surfaces defining a drive pin head receiving recess configured to receive a head of the externally threaded drive pin; and
   an external helical thread formation integrally connected to and extending outwardly from part of the body.

6. The anchor assembly externally threaded anchor of claim 5, wherein the mechanical engaging structure of the head of the externally threaded anchor is configured to be engageable by a same tool as the head of the externally threaded drive pin.

7. The anchor assembly externally threaded anchor of claim 5, wherein the independently movable gripping arms each include an interior ramp.

8. A method of installing and removing an anchor assembly, said anchor assembly including an externally threaded drive pin including: (a) a shank, (b) a head integrally connected to the shank, the head defining a mechanical engaging structure to enable rotation of the externally threaded drive pin, and (c) an external helical thread formation integrally connected to and extending outwardly from the shank; and an externally threaded anchor including: (i) an elongated tubular body including an inner surface defining a longitudinally extending inner channel, the body including at least two independently movable gripping arms, the independently movable gripping arms each including an interior ramp, wherein the inner surface of the elongated tubular body is without internal threads (ii) a head integrally connected to and extending from a first end of the body and including an inner surface that defines a longitudinally extending inner channel, the head including a plurality of first surfaces defining a mechanical engaging structure to enable rotation of the externally threaded anchor, wherein the inner surface of the head is without internal threads, the head also including a plurality of second surfaces defining a drive pin head receiving recess configured to receive the head of the externally threaded drive pin, and (iii) an external helical thread formation integrally connected to and extending outwardly from part of the body, said method comprising:

aligning a first object and a second object such that a first hole in the first object is aligned with a second hole in the second object;

positioning the anchor assembly through the first hole partially into the second hole and such that the externally threaded drive pin is partially positioned in the externally threaded anchor;

driving the externally threaded drive pin further into the externally threaded anchor causing the externally threaded drive pin to engage the interior ramps to cause the gripping arms to move outwardly to engage an interior surface that defines the second hole in the second object to secure the externally threaded anchor to the second object;

causing a tool to engage the mechanical engaging structure of the head of the externally threaded drive pin and rotating the tool to rotate the threaded drive pin to remove the externally threaded drive pin from the externally threaded anchor; and causing the tool to engage the mechanical engaging structure of the head of the externally threaded anchor and rotating the tool to rotate the externally threaded anchor to remove the externally threaded anchor from the first object and the second object.

9. The method of claim 8, wherein driving the externally threaded drive pin includes partially deforming the threads of the drive pin.

10. The method of claim 8, wherein driving the externally threaded drive pin includes using a driving device to drive the externally threaded drive pin.

11. The method of claim 10, wherein the driving device is a hammer.

12. The method of claim 10, wherein the driving device is a hammering tool.

13. The method of claim 8, wherein driving the externally threaded drive pin includes using a rotating device to rotate the externally threaded drive pin.

14. The method of claim 13, wherein the rotating device is a screw driver.

15. The method of claim 13, wherein the rotating device includes a screw head.

16. The method of claim 8, wherein driving the externally threaded drive pin includes either one of using a driving device to drive the externally threaded drive pin and using a rotating device to rotate the externally threaded drive pin.

17. A method of installing and removing an anchor assembly, said anchor assembly including an externally threaded drive pin including: (a) a shank, (b) a head integrally connected to the shank, the head defining a mechanical engaging structure to enable rotation of the externally threaded drive pin, and (c) an external helical thread formation integrally connected to and extending outwardly from the shank; and an externally threaded anchor including: (i) an elongated tubular body including an inner surface defining a longitudinally extending inner channel, the body including at least two independently movable gripping arms, the independently movable gripping arms each including an interior ramp, wherein the inner surface of the elongated tubular body is without internal threads, (ii) a head integrally connected to and extending from a first end of the body and including an inner surface that defines a longitudinally extending inner channel, the head including a mechanical engaging structure to enable rotation of the externally threaded anchor, wherein the inner surface of the head is without internal threads, the head also defining a drive pin head receiving recess configured to receive the head of the externally threaded drive pin, and (iii) an external helical thread formation integrally connected to and extending outwardly from part of the body, said method comprising:

aligning a first object and a second object such that a first hole in the first object is aligned with a second hole in the second object;

positioning the anchor assembly through the first hole partially into the second hole and such that the externally threaded drive pin is partially positioned in the externally threaded anchor;

driving the externally threaded drive pin further into the externally threaded anchor causing the externally threaded drive pin to engage the interior ramps to cause the gripping arms to move outwardly to engage an interior surface that defines the second hole in the second object to secure the externally threaded anchor to the second object, wherein driving the externally threaded drive pin includes partially deforming the threads of the drive pin;

causing a tool to engage the mechanical engaging structure of the head of the externally threaded drive pin and rotating the tool to rotate the threaded drive pin to remove the externally threaded drive pin from the externally threaded anchor; and causing the tool to engage the mechanical engaging structure of the head of the externally threaded anchor and rotating the tool to rotate the externally threaded anchor to remove the externally threaded anchor from the first object and the second object.

* * * * *